United States Patent
Hyle et al.

(10) Patent No.: US 9,332,729 B1
(45) Date of Patent: May 10, 2016

(54) PET PROXIMITY OPENED FOOD DISH DEVICE

(71) Applicants: Larry D. Hyle, La Verne, CA (US); Judy P. Hyle, La Verne, CA (US)

(72) Inventors: Larry D. Hyle, La Verne, CA (US); Judy P. Hyle, La Verne, CA (US)

( * ) Notice: Subject to any disclaimer, the term of this patent is extended or adjusted under 35 U.S.C. 154(b) by 238 days.

(21) Appl. No.: 13/950,385

(22) Filed: Jul. 25, 2013

(51) Int. Cl.
A01K 5/02 (2006.01)

(52) U.S. Cl.
CPC .......................................... A01K 5/02 (2013.01)

(58) Field of Classification Search
CPC ..... A01K 5/02; A01K 11/006; A01K 5/0114; A01K 15/021; A01K 5/025; A01K 5/0142; A01K 7/005; A01K 7/02; A01K 7/06
See application file for complete search history.

(56) References Cited

U.S. PATENT DOCUMENTS

| | | | |
|---|---|---|---|
| 4,644,903 A * | 2/1987 | Shaver | 119/51.01 |
| 5,669,328 A | 9/1997 | Lanfranchi | |
| 6,044,795 A | 4/2000 | Matsuura et al. | |
| 6,349,671 B1 | 2/2002 | Lewis et al. | |
| 6,446,574 B2 * | 9/2002 | Bickley | 119/55 |
| D504,545 S | 4/2005 | Morosin et al. | |
| 7,073,461 B2 * | 7/2006 | Gonet | 119/61.5 |
| 7,124,707 B1 | 10/2006 | Clarke | |
| 7,263,949 B1 * | 9/2007 | Seaford | A01K 5/0114 119/51.5 |
| 7,395,782 B1 * | 7/2008 | Lindsay | 119/51.02 |
| 7,426,901 B2 | 9/2008 | Turner et al. | |
| 7,874,265 B1 | 1/2011 | Addleman | |
| 7,895,973 B1 | 3/2011 | Whelan | |
| 2002/0134313 A1 * | 9/2002 | King et al. | 119/51.02 |
| 2005/0061252 A1 | 3/2005 | Meeks et al. | |
| 2006/0102100 A1 * | 5/2006 | Becker et al. | 119/720 |
| 2007/0125306 A1 * | 6/2007 | Beecher | 119/51.02 |
| 2008/0105205 A1 * | 5/2008 | Goehring | 119/51.02 |
| 2009/0241840 A1 * | 10/2009 | Mills | 119/51.02 |
| 2010/0147226 A1 * | 6/2010 | Tsengas | 119/501 |
| 2013/0192529 A1 * | 8/2013 | Kruger | A01K 7/005 119/72 |
| 2015/0040832 A1 * | 2/2015 | Klein | 119/51.11 |

* cited by examiner

Primary Examiner — Kathleen Alker

(57) ABSTRACT

A pet proximity opened food dish device opens a pet food dish for a specific pet. The device includes a bowl having an interior space configured for holding pet food. A lid is positionable between an open position providing access to the interior space and a closed position wherein the lid inhibits access to the interior space. An actuator is coupled to the bowl and the lid. The actuator selectively positions the lid in the closed position and the open position. A remote transmitter is coupled to a pet and a sensor is coupled to the bowl. The sensor detects when the remote transmitter is within a threshold distance from the bowl. The actuator is communicatively coupled to the sensor wherein the actuator positions the lid in the open position when the remote transmitter is within the threshold distance from the bowl.

1 Claim, 3 Drawing Sheets

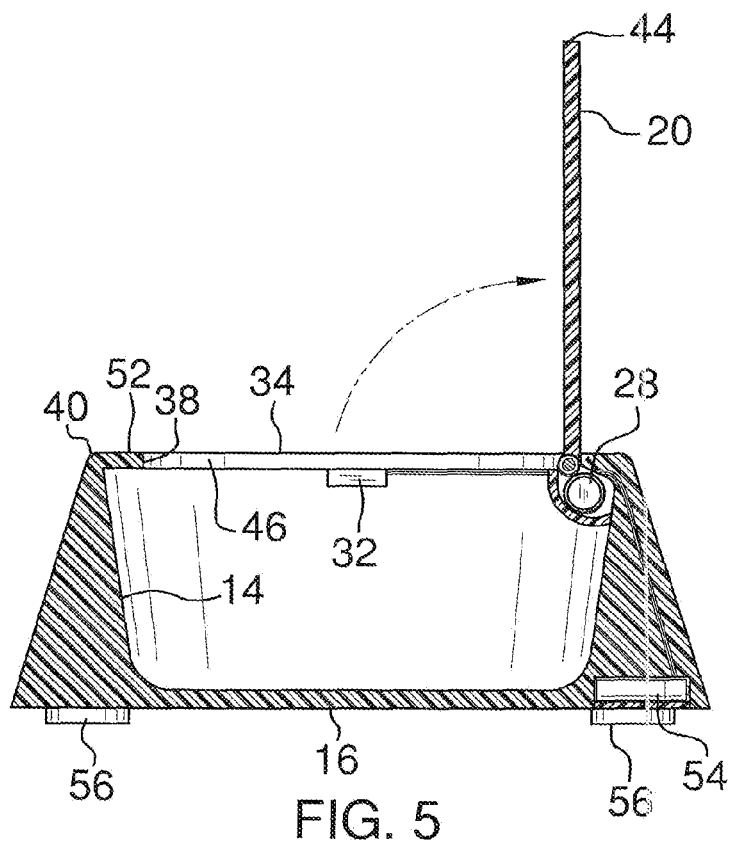
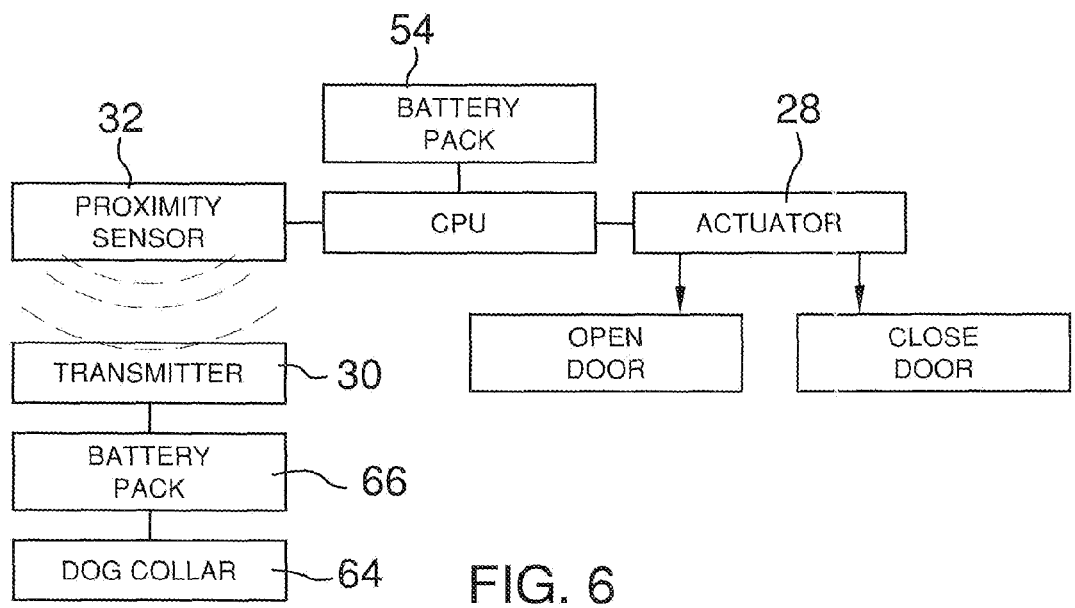
FIG. 5
FIG. 6

PET PROXIMITY OPENED FOOD DISH DEVICE

BACKGROUND OF THE DISCLOSURE

Field of the Disclosure

The disclosure relates to food dish devices and more particularly pertains to a new food dish device for automatically opening a pet food dish for a specific pet.

SUMMARY OF THE DISCLOSURE

An embodiment of the disclosure meets the needs presented above by generally comprising a bowl having an interior space configured for holding pet food. A lid is coupled to the bowl selectively covering an opening into the interior space. The lid is positionable between an open position providing access to the interior space and a closed position wherein the lid inhibits access to the interior space. An actuator is coupled to the bowl and the lid. The actuator selectively positions the lid in the closed position and the open position. A remote transmitter is coupled to a pet and a sensor is coupled to the bowl. The sensor detects when the remote transmitter is within a threshold distance from the bowl. The actuator is communicatively coupled to the sensor wherein the actuator positions the lid in the open position when the remote transmitter is within the threshold distance from the bowl.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 5 is a cross-sectional view of an embodiment of the disclosure taken along line 5-5 of FIG. 4.

FIG. 6 is a schematic view of an embodiment of the disclosure.

DESCRIPTION OF THE PREFERRED EMBODIMENT

Figure 1:
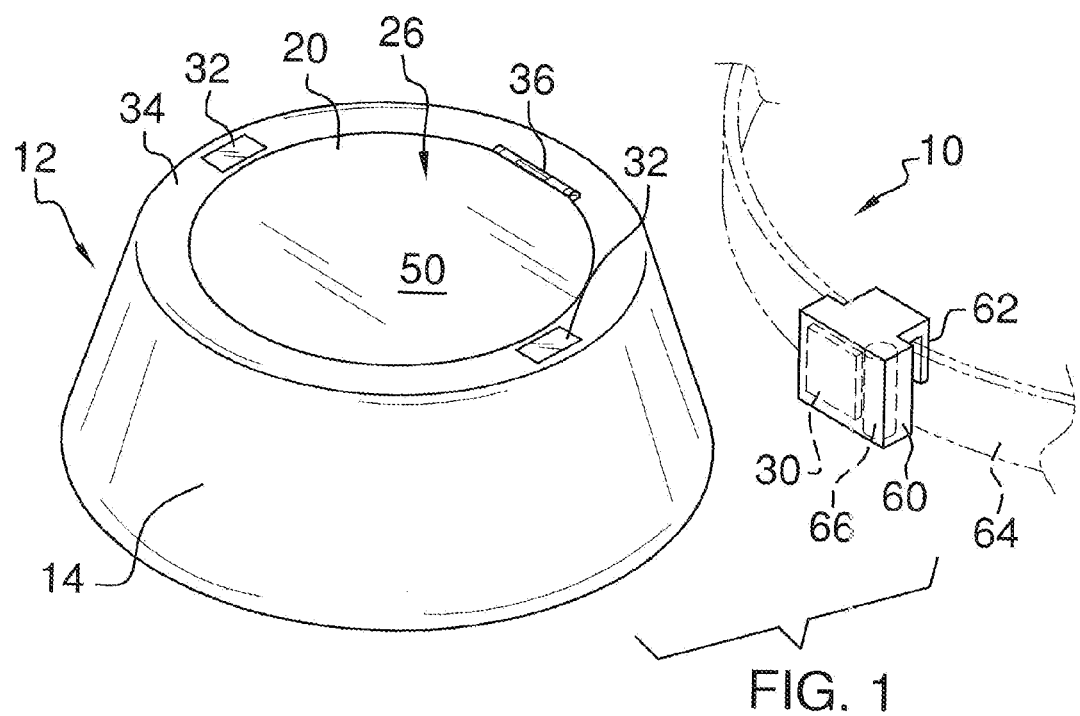
FIG. 1 is a top front side perspective view of a pet proximity opened food dish device according to an embodiment of the disclosure.
Figure 2:
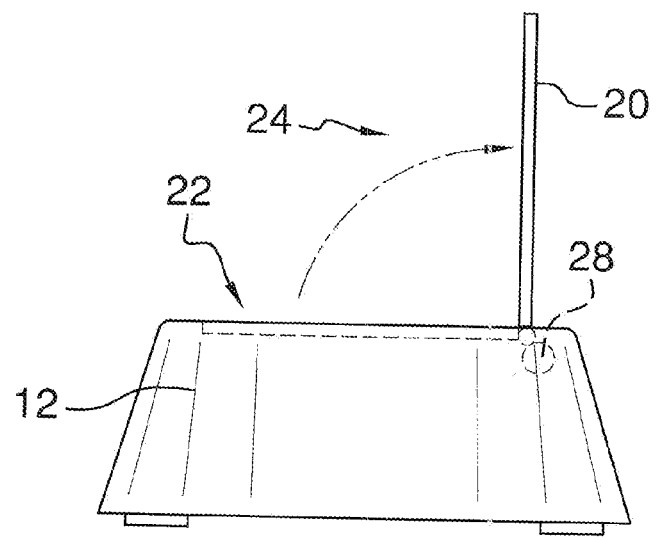
FIG. 2 is a side view of an embodiment of the disclosure.
Figure 3:
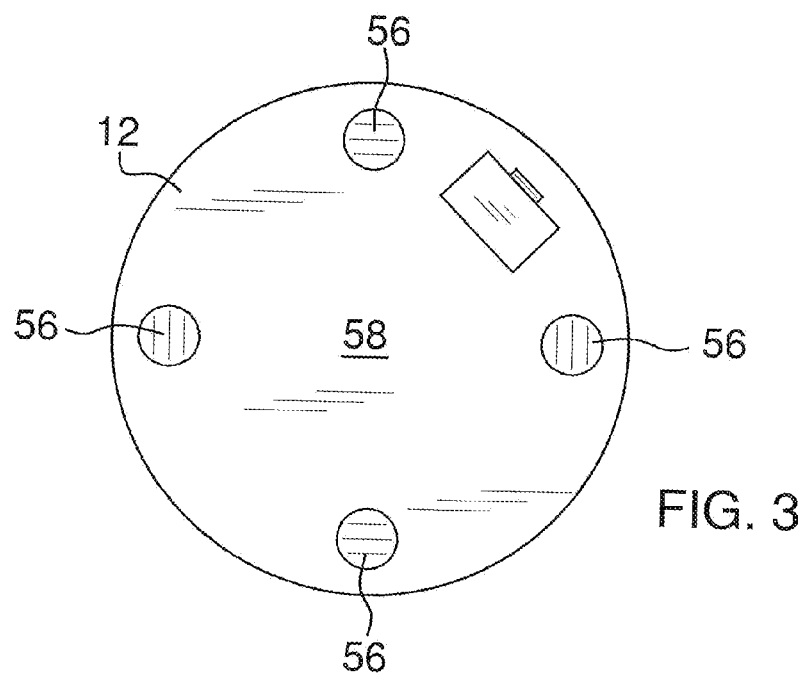
FIG. 3 is a bottom view of an embodiment of the disclosure.
Figure 4:
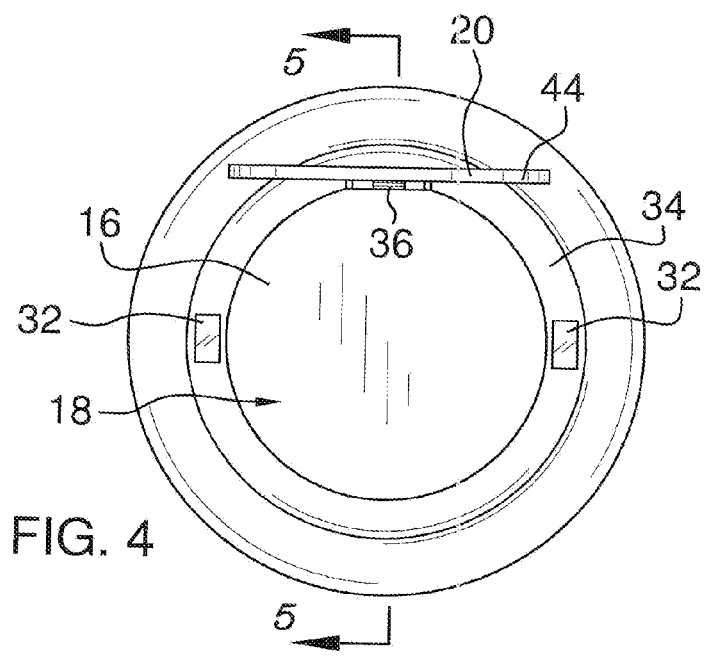
FIG. 4 is a top view of an embodiment of the disclosure.

With reference now to the drawings, and in particular to FIGS. 1 through 6 thereof, a new food dish device embodying the principles and concepts of an embodiment of the disclosure and generally designated by the reference numeral 10 will be described.

As best illustrated in FIGS. 1 through 6, the pet proximity opened food dish device 10 generally comprises a bowl 12 having a sidewall 14 and a bottom wall 16 coupled to the sidewall 14 to define an interior space 18 of the bowl 12 configured for holding pet food, water, or the like. A lid 20 is coupled to the bowl 12. The lid 20 selectively covers an opening 22 into the interior space 18 of the bowl 12. The lid 20 is positionable between an open position 24 providing access to the interior space 18 of the bowl 12 through the opening 22 and a closed position 26 wherein the lid 20 inhibits access to the interior space 18 of the bowl 12 through the opening 22. An actuator 28 is operationally coupled to the bowl 12 and the lid 20. The actuator 28 selectively positions the lid 20 in the closed position 26 and the open position 24. A remote transmitter 30 is configured for coupling to a pet. At least one sensor 32 is coupled to the bowl 12. Each sensor 32 may be positioned on a rim 34 of the bowl 12 adjacent to the opening 22. The sensor 32 detects when the remote transmitter 30 is within a threshold distance from the bowl 12. The actuator 28 is communicatively coupled to the sensor 32 wherein the actuator 28 positions the lid 20 in the open position 24 when the remote transmitter 30 is within the threshold distance from the bowl 12. Thus, access to food or water in the bowl 12 may be restricted to a particular pet because the lid 20 is only in the open position 24 when the particular pet is close to the bowl 12.

A hinge 36 may be coupled the lid 20 and the bowl 12. The actuator 28 is mechanically coupled to the hinge 36 to pivot the lid 20 between the open position 24 and the closed position 26. A lip 38 may be coupled to a top edge 40 of the sidewall 14 of the bowl 12. The lip 38 extends inwardly towards the interior space 18 of the bowl 12 restricting the size of the opening 22 into the interior space 18. A peripheral edge 44 of the lid 20 is adjacent to a distal edge 46 of the lip 38 relative to the sidewall 14 when the lid 20 is in the closed position 26 such that the lid 20 is positioned within the opening 22. A top surface 50 of the lid 20 may be coplanar to a top surface 52 of the lip 38 or sidewall 14 preventing an unauthorized animal from engaging the peripheral edge 44 of the lid 20 while the lid 20 is in the closed position 26.

A base battery 54 may be coupled to the bowl 12 and electrically coupled to the actuator 28. A plurality of footings 56 may also be coupled to and extend from a bottom surface 58 of the bottom wall 16 of the bowl 12.

The remote transmitter 30 may be coupled to and positioned in a remote housing 60. A clip 62 may be coupled to and extend from the remote housing 60 wherein the remote housing 60 is configured for coupling to a collar 64 worn by a pet authorized to access the interior space 18 of the bowl 12. A remote battery 66 is coupled to the remote housing 60 and electrically coupled to the remote transmitter 30 allowing the pet to roam freely.

In use, food or water is placed into the interior space 18 of the bowl 12. The remote transmitter 30 is coupled to a pet authorized to access the interior space 18 of the bowl 12. When the pet approaches the bowl 12 the remote transmitter 30 is positioned within the threshold distance as detected by the sensor 32. The actuator 28 then lifts or pivots the lid 20 into the open position 24 until the pet and the remote transmitter 30 move outside the threshold distance from the bowl 12. Multiple devices 10 may also be used simultaneously within a household. Thus, access to contents of a particular bowl 12 may be restricted to a particular pet allowing different foods to be given to different pets.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A pet proximity opened food dish device comprising:
   a bowl having a sidewall and a bottom wall coupled to said sidewall to define an interior space of said bowl configured for holding pet food;
   a lid coupled to said bowl, said lid selectively covering an opening into said interior space of said bowl, said lid being positionable between an open position providing access to said interior space of said bowl through said opening and a closed position wherein said lid inhibits access to said interior space of said bowl through said opening;
   an actuator coupled to said bowl and said lid, said actuator selectively positioning said lid in said closed position and said open position;
   a remote transmitter configured for coupling to a pet;
   a sensor coupled to said bowl, said sensor detecting when said remote transmitter is within a threshold distance from said bowl, said actuator being communicatively coupled to said sensor wherein said actuator positions said lid in said open position when said remote transmitter is within said threshold distance from said bowl;
   a hinge coupling said lid to said bowl, said actuator being mechanically coupled to said hinge;
   a lip coupled to a top edge of said sidewall of said bowl, said lip extending inwardly towards said interior space of said bowl;
   a peripheral edge of said lid being adjacent to and laterally aligned with a distal edge of said lip relative to said sidewall when said lid is in said closed position wherein a top surface of said lid is coplanar with a top surface of said lip;
   a base battery coupled to said bowl, said base battery being electrically coupled to said actuator;
   a plurality of footings coupled to and extending from a bottom surface of said bottom wall of said bowl;
   a remote housing, said remote transmitter being coupled to and positioned in said remote housing;
   a clip coupled to and extending from said remote housing wherein said remote housing is configured for coupling to a collar; and
   a remote battery coupled to said remote housing, said remote battery being electrically coupled to said remote transmitter.

* * * * *